(12) United States Patent
Eagan

(10) Patent No.: US 6,978,675 B2
(45) Date of Patent: Dec. 27, 2005

(54) VEHICLE MAINTENANCE SENSING DEVICE AND METHOD THEREFOR

(76) Inventor: Christopher S. Eagan, 670 E. Eldorado La., Las Vegas, NV (US) 89123-0508

( * ) Notice: Subject to any disclaimer, the term of this patent is extended or adjusted under 35 U.S.C. 154(b) by 82 days.

(21) Appl. No.: 10/770,077

(22) Filed: Feb. 2, 2004

(65) Prior Publication Data

US 2005/0166668 A1  Aug. 4, 2005

(51) Int. Cl.[7] .............................................. G01N 29/24
(52) U.S. Cl. ........................................ 73/587; 73/654
(58) Field of Search ......................... 73/587, 584, 592, 73/660, 661

(56) References Cited

U.S. PATENT DOCUMENTS

| | | | | |
|---|---|---|---|---|
| 4,038,866 A | * | 8/1977 | Johnson | ........................ 73/654 |
| 4,287,581 A | * | 9/1981 | Neale, Sr. | .................... 367/135 |
| 4,612,620 A | * | 9/1986 | Davis et al. | ................. 702/184 |
| 5,435,185 A | * | 7/1995 | Eagan | ........................... 73/587 |
| 5,445,026 A | * | 8/1995 | Eagan | ........................... 73/591 |
| 6,220,098 B1 | * | 4/2001 | Johnson et al. | ............... 73/592 |
| 6,360,607 B1 | * | 3/2002 | Charette et al. | ............... 73/587 |
| 6,638,101 B1 | * | 10/2003 | Botelho | ....................... 439/504 |
| 6,766,692 B1 | * | 7/2004 | Eagan | ........................... 73/587 |
| 6,847,394 B1 | * | 1/2005 | Hansen et al. | ................. 348/82 |

* cited by examiner

*Primary Examiner*—Hezron Williams
*Assistant Examiner*—Rose M. Miller
(74) *Attorney, Agent, or Firm*—Jeffrey D. Moy; Harry M. Weiss; Weiss, Moy & Harris, P.C.

(57) ABSTRACT

A vehicle maintenance device for acoustical and vibration sensing of an engine has a flexible wand member having a channeling running the length of the flexible wand member. A housing is coupled to a first end of the flexible wand member. A handle section is coupled to a second end of the flexible wand member. The handle section has an internal cavity section. Sensing circuitry is positioned in the maintenance device and is used for performing acoustical and vibration sensing of an engine of the vehicle.

14 Claims, 4 Drawing Sheets

VEHICLE MAINTENANCE SENSING DEVICE AND METHOD THEREFOR

BACKGROUND OF THE INVENTION

1. Field of the Invention

This invention relates generally to automotive industry and, more specifically, to a vehicle maintenance device which is used for acoustical sensing and vibration sensing during the inspection/repair of an engine of a vehicle.

2. Description of the Prior Art

Engine inspection is important in order for a vehicle to run properly. To properly inspect the engine of a vehicle, one must use some type of listening device to see if certain engine components are functioning properly. The listening device is generally used to hear if a certain engine component is running smoothly, whether an engine component is leaking, and the like.

Presently, there are devices which allow a user to listen to engine noise. Unfortunately, these listening devices have several problems. First, when using a standard type listening device under the hood of a vehicle, the wind/noise generated from the cooling fan and other engine components interfere with hearing the sounds of the various components that one is trying to listen too and diagnose.

Another problem with standard type listening devices is that it is difficult to get these devices near the engine component that needs to be listened to and diagnosed. Some engine components are in hard to reach areas. Many times it is difficult for a mechanic to position a listening device near these components. Furthermore, many engine components are near moving parts are parts with exposed electrical connections. It is difficult for present listening device to get near these components without being damaged or destroyed by coming into contact with the moving parts.

Furthermore, many engine components are in an area where it is difficult to see. These components are generally in an area where there is no room for a separate light source like a flashlight or drop light. This is very problematic if the engine component is near a moving part are a part with exposed electrical connections. Thus, present listening devices are not able to access these engine components located in areas where it is difficult to see.

Therefore, a need existed to provide an improved vehicle maintenance sensing device. The improved vehicle maintenance sensing device must be able to provide acoustical and vibration sensing of engine components and overcome the problems associate with prior art sensing devices.

SUMMARY OF THE INVENTION

In accordance with one embodiment of the present invention, it is an object of the present invention to provide an improved vehicle maintenance sensing device.

It is another object of the present invention to provide an improved vehicle maintenance sensing device must be able to provide acoustical and vibration sensing of engine components and overcome the problems associate with prior art sensing devices.

BRIEF DESCRIPTION OF THE EMBODIMENTS

In accordance with one embodiment of the present invention, a vehicle maintenance device for acoustical and vibration sensing of an engine is disclosed. The maintenance device has a flexible wand member having a channeling running the length of the flexible wand member. A housing is coupled to a first end of the flexible wand member. A handle section is coupled to a second end of the flexible wand member. The handle section has an internal cavity section. Sensing circuitry is positioned in the maintenance device and is used for performing acoustical and vibration sensing of an engine of the vehicle.

In accordance with another embodiment of the present invention, a vehicle maintenance device for acoustical and vibration sensing of an engine is disclosed. The maintenance device has a flexible wand member that has a channeling running the length of the flexible wand member. The flexible wand member is rigid enough to hold shape when bent. A housing is coupled to a first end of the flexible wand member. A handle section is coupled to a second end of the flexible wand member. The handle section has an internal cavity section. Sensing circuitry is provided for performing acoustical and vibration sensing of an engine of the vehicle. The sensing circuitry has a power supply for powering the sensing circuitry. A first microphone that is exposed to the environment is coupled to the power supply. A second microphone that is sealed from the environment is coupled to the power supply. A light is coupled to the power supply to illuminate an area that is being diagnosed. An amplifier is coupled to the first microphone and the second microphone. An output jack is provided for hearing signals from the first microphone and the second microphone. A switching device is coupled to the first microphone and the second microphone to activate and deactivate the first microphone and the second microphone.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Figure 1:
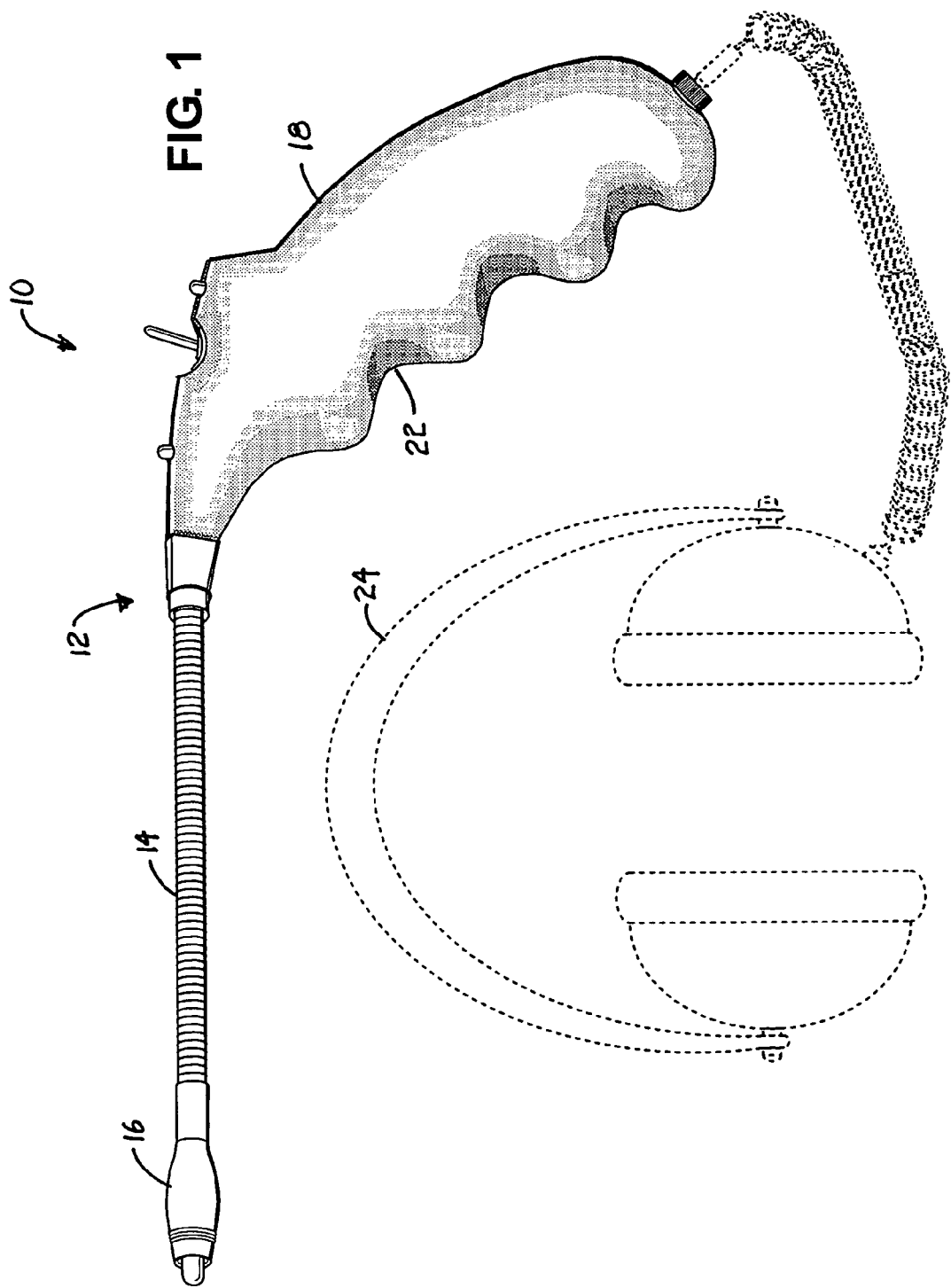
FIG. 1 is an elevated perspective of one embodiment of the present invention.
Figure 2:
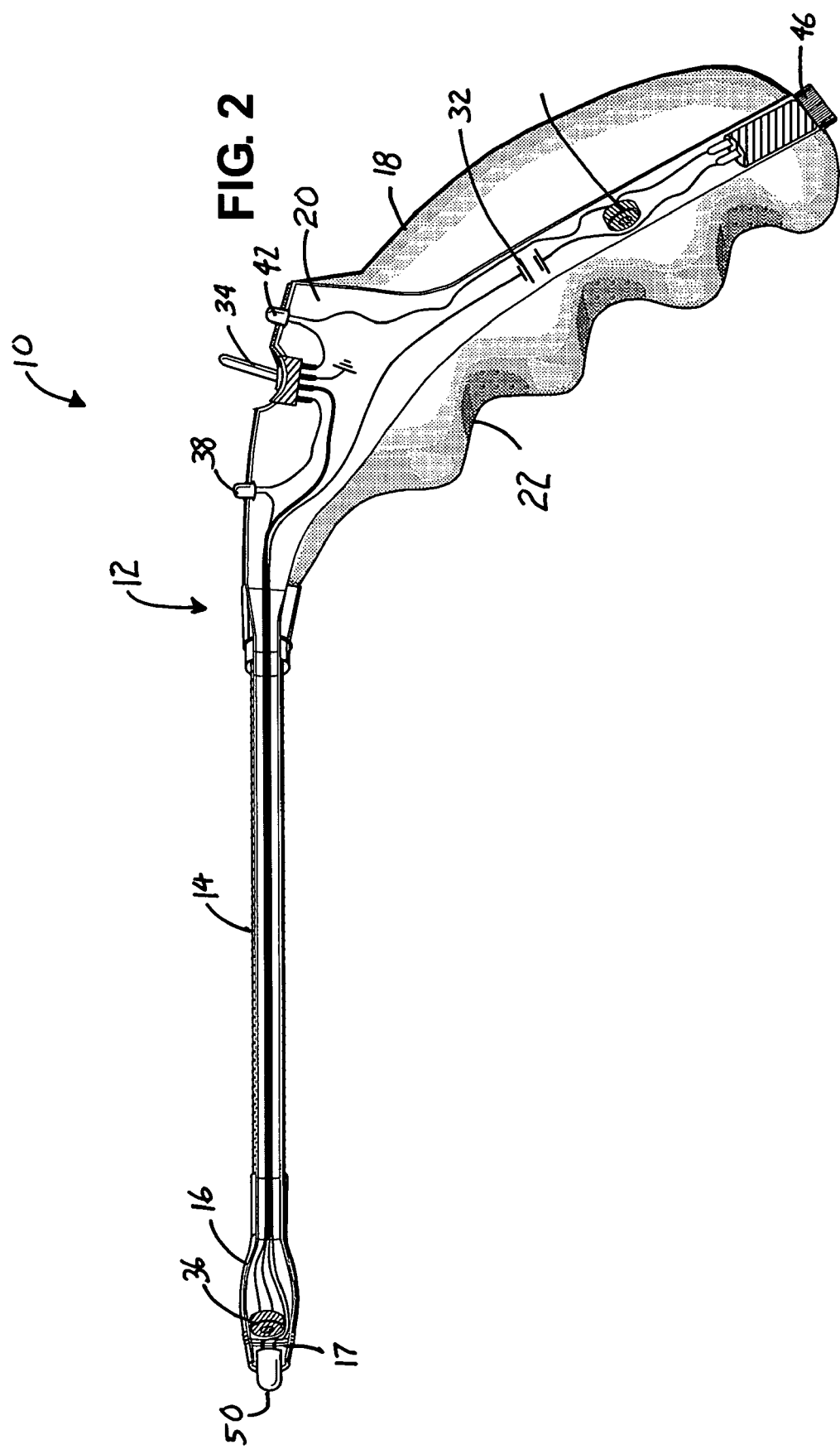
FIG. 2 is a cross-sectional view of the embodiment depicted in FIG. 1.
Figure 3:
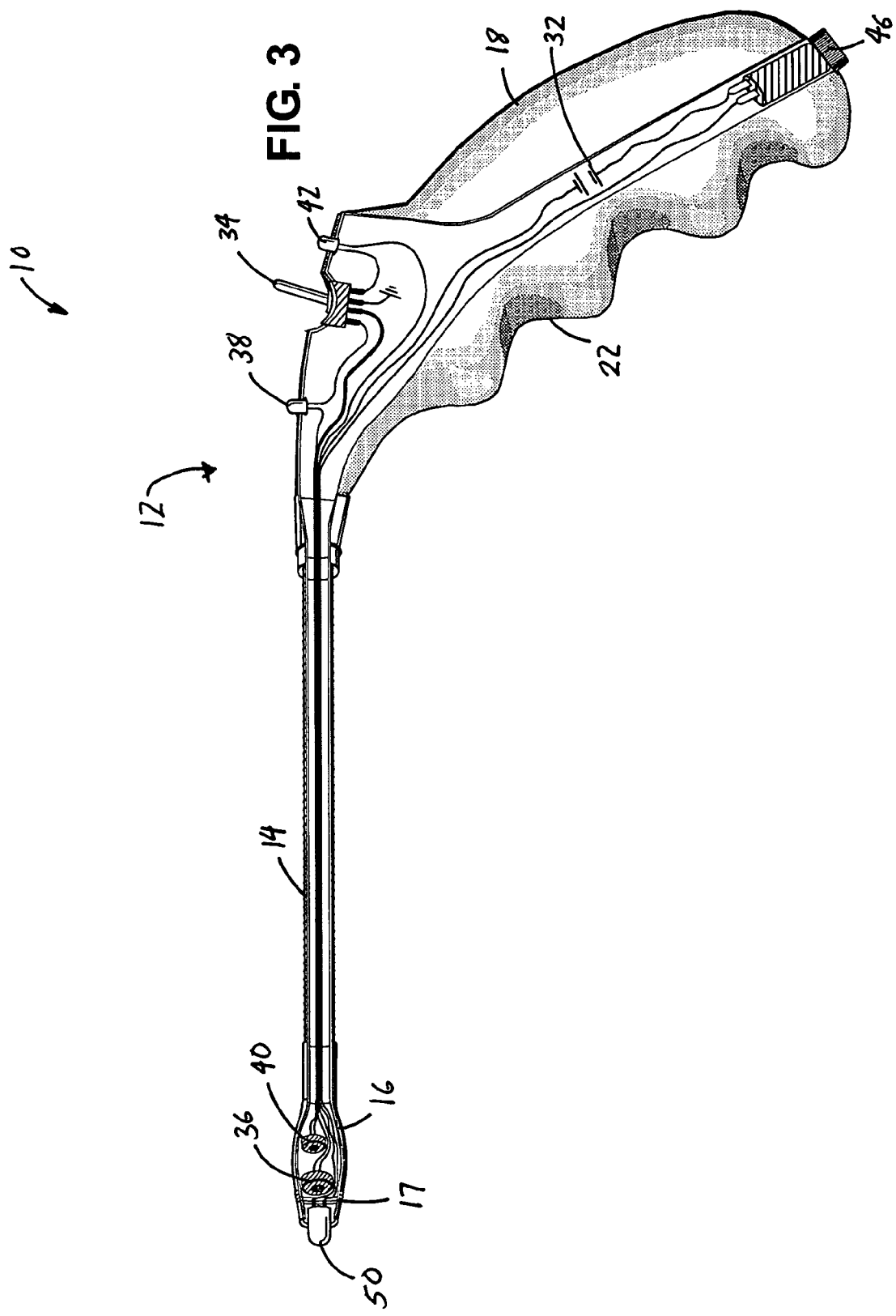
FIG. 3 is a cross-sectional view of another embodiment of the present invention.
Figure 4:
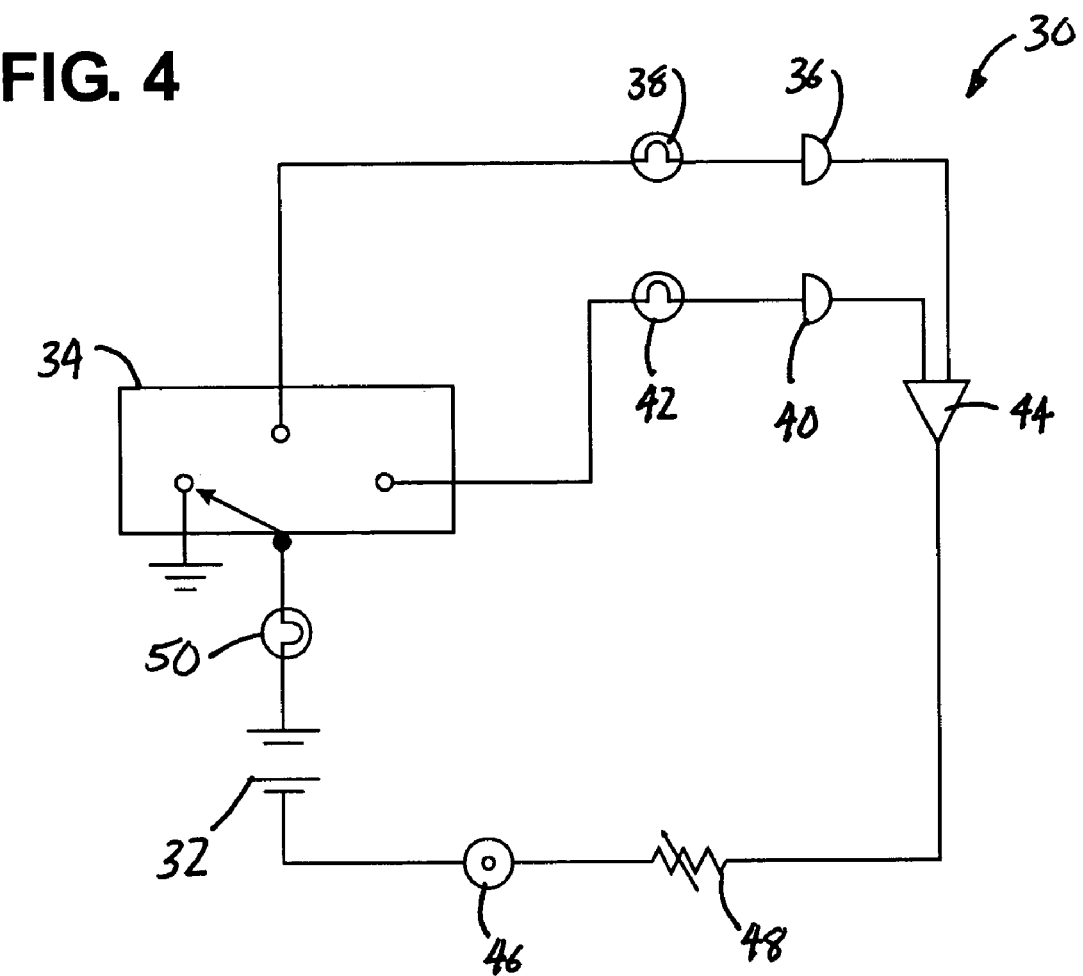
FIG. 4 is a simplified electrical schematic of the sensing circuitry used in the present invention.

Referring to the Figures, a vehicle maintenance sensing device 10 (hereinafter sensing device 10) is shown. The sensing device 10 is comprised of a body section 12 and sensing circuitry 30. The body section 12 is comprised of a flexible wand member 14. In general, the flexible wand member 14 is made of a flexible tubing. The flexible tubing must be rigid enough so that when the flexible wand member 14 is bent, the flexible wand member 14 will hold it's shape. In accordance with one embodiment of the present invention, the flexible wand member 14 is made of a flexible metal conduit having a non-conductive covering. The above is given as an example and should not be seen as to limit the scope of the present invention.

A housing 16 is coupled to one end of the flexible wand member 14. The housing 16 is used to hold and protect certain components of the sensing circuitry 30. The housing 16 is generally made of a light weight but sturdy material. In general, some type of metal or plastic may be used. The above are given as examples and should not be seen as to limit the scope of the present invention.

A handle section 18 is coupled to the other end of the flexible wand member 14 opposite of the housing 16. The handle section 18 has an internal cavity 20 which is used to house certain components of the sensing circuitry 30. The flexible wand member 14 is coupled to the handle section 18 so that the flexible wand member 14 enters the internal cavity 20. Thus a pathway is formed through the flexible wand member 14 into the internal cavity 20.

The handle section 16 may have a plurality of grooves 22. The groves 22 are generally formed on a side surface of the handle section 18. The grooves 22 are used as a hand grip to allow one to more easily and securely hold the sensing device 10.

The sensing circuitry 30 has a power supply 32. The power supply 32 is generally a dc power source like a battery. However, this should not be seen as to limit the scope of the present invention. Other types of power supplies may be used. A switching device 34 is coupled to the power supply 32. The switching device 34 is used to activate and deactivate the sensing circuitry 30. The switching device 34 has a first contact which is grounded and essential deactivates the sensing circuitry 30. A second contact of the switching device 34 couples the power supply 32 to a first microphone 36. The first microphone 36 is an exposed microphone. The first microphone 36 may be fully exposed or semi-exposed to the outside environment. The first microphone 36 is used to monitor noise and/or hissing from different engine components that are being inspected. A light 38 is coupled to the first microphone 36. The light 38 may be an LED or the like. The light 38 is used as an indicator to let a user know that the first microphone 36 is active. A third contact of the switching device 34 couples the power supply 32 to a second microphone 40. The second microphone 40, is a sealed microphone. The second microphone 40 needs to be sealed from the outside environment. The second microphone 40 is used to monitor vibration noise from different engine components that are being inspected. A light 42 is coupled to the second microphone 40. The light 42 may be an LED or the like. The light 42 is used as an indicator to let a user know that the second microphone 42 is active.

Outputs of the first microphone 36 and the second microphone 40 are coupled to an input of an amplifier 44. The amplifier 44 is used to increase the signal strength of the output signals generated from the first microphone 36 and the second microphone 40. An output signal generated from the amplifier 44 is then sent to an output jack 46. The output jack 46 is sized to fit a standard male headphone jack. A variable attenuator 48 is coupled to the output jack 46. The variable attenuator 48 is used to control the volume of the output signal that is sent out of the output jack 46.

A light 50 is coupled to the power supply 32 and the switching device 34. Thus, once the sensing circuitry 30 is activated, the light 50 will illuminate. The light 50 is used as a spot light to illuminate areas in the engine which are being diagnosed. The light 50 may be a standard bulb light or LED. An ultraviolet light may also be used. An ultraviolet light would allow one to see certain leaks which may not be visible to the naked eye. The light 50 would be interchangeable to allow a user to select different light sources for different applications.

The sensing circuitry 30 may be positioned in the sensing device 10 in a variety of different manners. In accordance with one embodiment of the present invention, the light 50 is placed in the housing 16. The housing 16 will have a contact mechanism 17 which will allow the light 50 to be removed and replaced with a different type of bulb. Thus, the contact mechanism 17 allows for interchangeable bulbs.

The first microphone 36 is also placed in the housing 16. The first microphone 36 is positioned behind the light 50 but is still open to the environment. However, the first microphone 36 may be positioned in other areas on the sensing device 10. The first microphone 36 just needs to be positioned so that it's open or semi-opened to the environment.

The second microphone 40 is positioned in an enclosed area that is sealed from the outside environment. In accordance with one embodiment of the present invention, the second microphone 40 is positioned behind the first microphone 36 in an enclosed area 19 of the housing 16. However, the second microphone 40 may also be positioned in the handle section 18 of the sensing device 10 or in other enclosed areas of the sensing device 10.

The handle section 18 will generally house the switching device 34, the lights 38 and 42, and the output jack 46. The power supply 32 may also be positioned in the handle section 18. However, in accordance with another embodiment of the present invention, the power supply 32 is positioned outside of the sensing device 10 in the headphones 24. The amplifier 44 and the variable attenuator 48 may also be positioned outside of the sensing device 10 in the headphones 24. In general, the wiring for all components in the housing 16 will run through the flexible wand member 14 and into the internal cavity 20 of the handle section 18. The wiring from all the components in the handle section 18 will be stored in the internal cavity 20 of the handle section 18. If the power supply 32 is also in the handle section 18, then all wiring for the sensing circuitry 30 will converge to the power supply 32 in the handle section 18. If the power supply 32 and any other components are positioned outside of the sensing device 10, then wiring must be run outside of the sensing device 10 to the power supply 32 and other components. For example, the wiring could run out of the output jack 46 and through the wiring 26 of the headphone 24 to a power supply 32 positioned in the headphones 24.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A vehicle maintenance device for acoustical and vibration sensing of an engine comprising:
    a flexible wand member having a channeling running the length of the flexible wand member;
    a housing coupled to a first end of the flexible wand member;
    a handle section coupled to a second end of the flexible wand member, the handle section having an internal cavity section; and
    sensing circuitry for performing acoustical and vibration sensing of an engine of the vehicle wherein the sensing circuitry comprises:
    a power supply for powering the sensing circuitry;

a first microphone exposed to the environment coupled to the power supply;

a second microphone sealed from the environment coupled to the power supply; and a switching device coupled to the first microphone and the second microphone to activate and deactivate the first microphone and the second microphone.

2. A vehicle maintenance device for acoustical and vibration sensing of an engine in accordance with claim 1 wherein the flexible wand member is rigid enough to hold shape when bent.

3. A vehicle maintenance device for acoustical and vibration sensing of an engine in accordance with claim 1 wherein the handle section has ridges for forming a hand grip.

4. A vehicle maintenance device for acoustical and vibration sensing of an engine in accordance with claim 1 wherein the sensing circuitry further comprises a light coupled to the power supply to illuminate an area that is being diagnosed.

5. A vehicle maintenance device for acoustical and vibration sensing of an engine in accordance with claim 4 wherein the light is an LED.

6. A vehicle maintenance device for acoustical and vibration sensing of an engine in accordance with claim 4 wherein the light is an ultraviolet light.

7. A vehicle maintenance device for acoustical and vibration sensing of an engine in accordance with claim 4 wherein the first microphone, the second microphone, and the light are positioned in the housing.

8. A vehicle maintenance device for acoustical and vibration sensing of an engine in accordance with claim 4 wherein the first microphone and the light are positioned in the housing and the second microphone and the power supply are located in the handle section.

9. A vehicle maintenance device for acoustical and vibration sensing of an engine in accordance with claim 1 wherein the sensing circuitry further comprises indicator lights coupled to the first microphone and the second microphone to show when the first microphone and the second microphone are activated.

10. A vehicle maintenance device for acoustical and vibration sensing of an engine in accordance with claim 1 wherein the sensing circuitry further comprises an amplifier coupled to the first microphone and the second microphone.

11. A vehicle maintenance device for acoustical and vibration sensing of an engine in accordance with claim 1 wherein the sensing circuitry further comprises an output jack for hearing signals from the first microphone and the second microphone.

12. A vehicle maintenance device for acoustical and vibration sensing of an engine in accordance with claim 11 wherein the sensing circuitry further comprises an attenuator coupled to the output jack for increasing and decreasing the signals from the first microphone and the second microphone.

13. A vehicle maintenance device for acoustical and vibration sensing of an engine comprising:

a flexible wand member having a channeling running the length of the flexible wand member wherein the flexible wand member is rigid enough to hold shape when bent;

a housing coupled to a first end of the flexible wand member;

a handle section coupled to a second end of the flexible wand member, the handle section having an internal cavity section; and sensing circuitry for performing acoustical and vibration sensing of an engine of the vehicle wherein the sensing circuitry comprises:

a power supply for powering the sensing circuitry;

a first microphone exposed to the environment coupled to the power supply;

a second microphone sealed from the environment coupled to the power supply;

a light coupled to the power supply to illuminate an area that is being diagnosed;

an amplifier coupled to the first microphone and the second microphone;

an output jack for hearing signals from the first microphone and the second microphone; and a switching device coupled to the first microphone and the second microphone to activate and deactivate the first microphone and the second microphone.

14. A vehicle maintenance device for acoustical and vibration sensing of an engine in accordance with claim 13 wherein the sensing circuitry further comprises:

indicator lights coupled to the first microphone and the second microphone to show when the first microphone and the second microphone are activated; and an attenuator coupled to the output jack for increasing and decreasing the signals from the first microphone and the second microphone.

* * * * *